June 2, 1970 M. IGLEWITZ 3,515,198
INFLATABLE TUBELESS TIRE SEATING DEVICE
Filed March 5, 1968 3 Sheets-Sheet 1

MEYER IGLEWITZ
INVENTOR.

BY George B. Oniwolk

ATTORNEY

June 2, 1970            M. IGLEWITZ            3,515,198
INFLATABLE TUBELESS TIRE SEATING DEVICE
Filed March 5, 1968            3 Sheets-Sheet 2
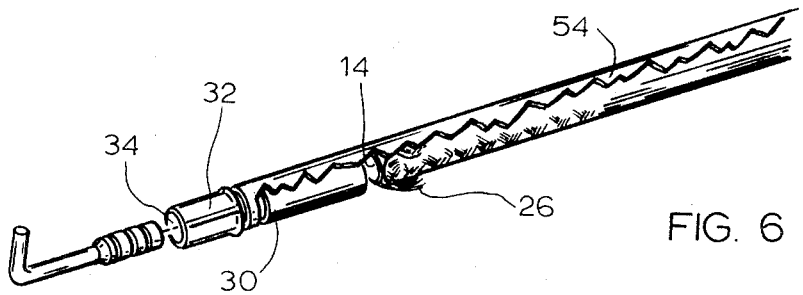
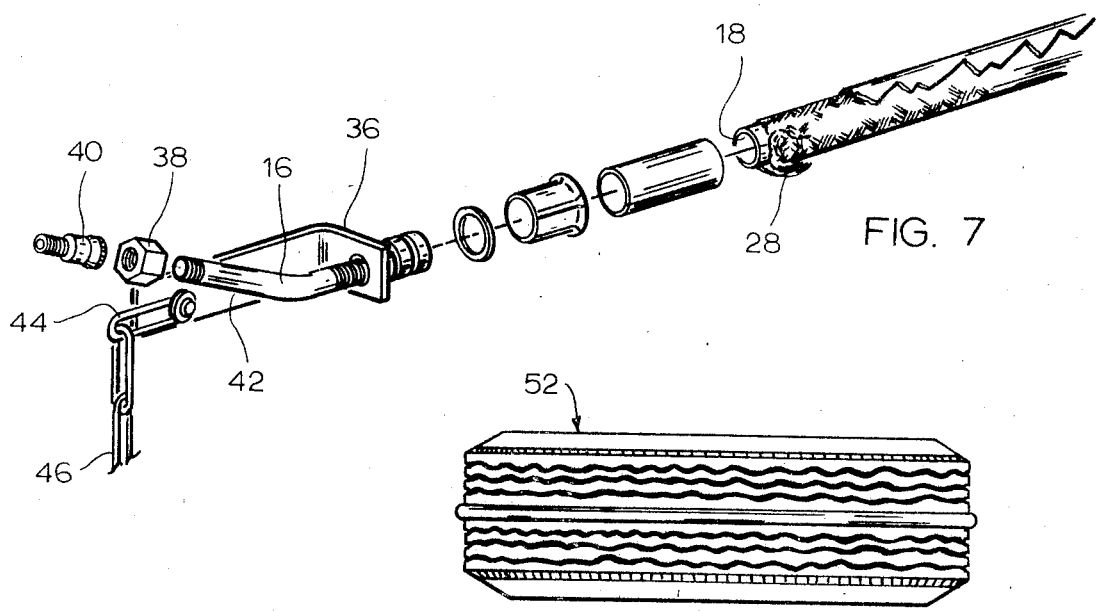
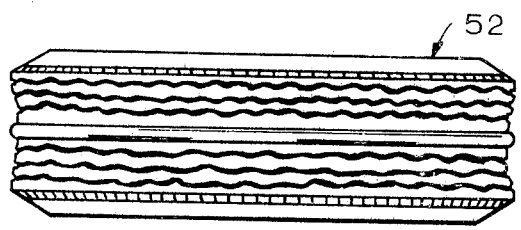
MEYER IGLEWITZ
INVENTOR.
BY *George D. Oujevolk*
ATTORNEY June 2, 1970  M. IGLEWITZ  3,515,198
INFLATABLE TUBELESS TIRE SEATING DEVICE
Filed March 5, 1968  3 Sheets-Sheet 3

MEYER EAGLES

INVENTOR.

George B. Onjwolk
ATTORNEY

United States Patent Office 3,515,198
Patented June 2, 1970

3,515,198
INFLATABLE TUBELESS TIRE SEATING DEVICE
Meyer Iglewitz, 178 Sherman Ave.,
Newark, N.J. 07114
Filed Mar. 5, 1968, Ser. No. 710,494
Int. Cl. B60c 25/12
U.S. Cl. 157—1.21
2 Claims

ABSTRACT OF THE DISCLOSURE

A seating belt for seating tubeless tires on a wheel rim. The seating belt comprises an elongated flexible tube, sealed at one end, a gas feed fitting at the other end of the tubing including a threaded central section and a fitting inlet for receiving a compressed gas. A cylindrical sheath is placed around the tubing. This sheath has a wire mesh, the individual wires of the mesh intersect at a small angle. The sheath has outwardly turned collars at both ends. The fitting inlet projects through one of the collars. A hook passes through the collar from the end opposite the inlet fitting. Crimped shield means are disposed over the collar to hold the hook and inlet fitting in place. Attached to the fitting are chain holding means with a chain extending from the chain holding means and which can engage the hook so that the seating belt can be placed around the tire to be mounted, the hook engaging the chain, and, the tubing can be filled with compressed air through the inlet fitting.

---

The present invention relates to tubeless tire seating belt which can be placed around a tubeless tire when mounting the tire on an automobile wheel rim so as to properly seat the tire on the wheel rim as it is being inflated.

The problem of mounting tubeless tires on wheel rims has already received considerable attention, and, one of the typical examples of the devices of the prior art is described in the Fleming U.S. Pat. No. 2,835,319. Generally, the prior art devices make use of specially constructed materials, i.e., special tubing and special sheaths. Thus, for the purposes of the Fleming patent, it is shown that the sheath should have individual strands of interwoven helices with a helical angle of from about 25° to 45° which can be 25° to 30° in the extended state. The difficulty with this type of sheath is that such a weave is not readily available and requires special machines or machines with special weave settings to produce the precise angular limits which are described. It has now been discovered that commercially available woven sheath may be advantageously used in combination with the gripping arrangement herein described to provide a tire mounting seating belt.

The invention as well as other objects and advantages thereof will be more readily apparent from the following detailed description when taken in conjunction with the accompanying drawings, in which:

FIG. 3 illustrates in perspective how the belt shown in FIG. 1 is placed around a tire to be mounted on a wheel;

FIG. 4 depicts the belt and tire illustrated in FIG. 3 at a later stage of the operation;

Figure 1:
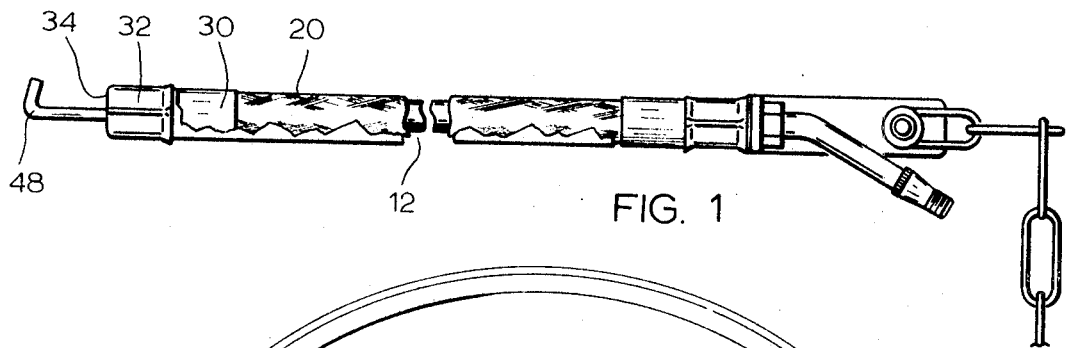
FIG. 1 is a longitudinal perspective view of the tire mounting seating belt contemplated herein.
Figure 2:
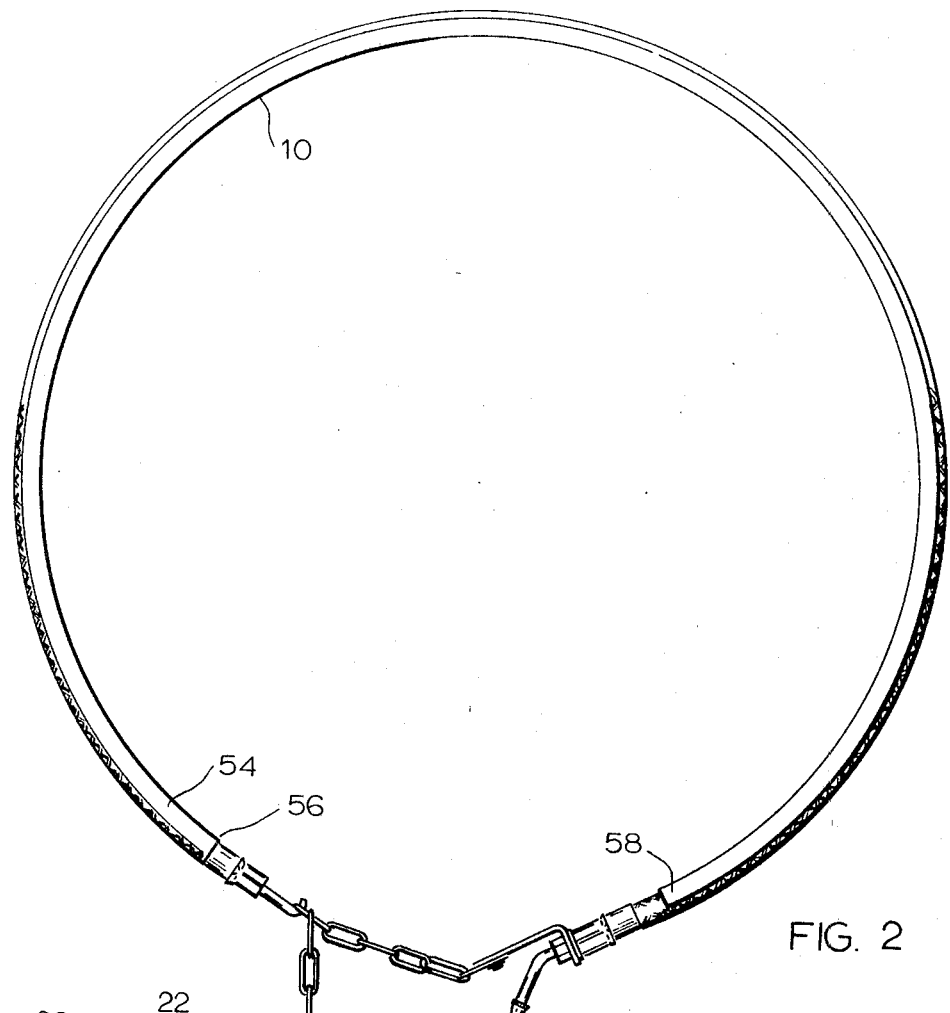
FIG. 2 is a top view of the tire mounting seating belt shown in FIG. 1.
Figure 5:
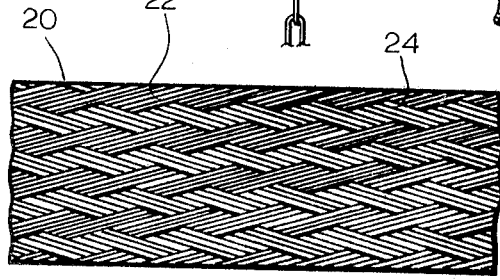

FIG. 5 provides a top view of the weave used on the belt sheath shown in FIG. 1;

FIG. 6 shows an exploded view of one end of the tire mounting seating belt shown in FIG. 1;

FIG. 7 is an exploded view of the other end of the tire mounting seating belt shown in FIG. 1.

Figure 8:
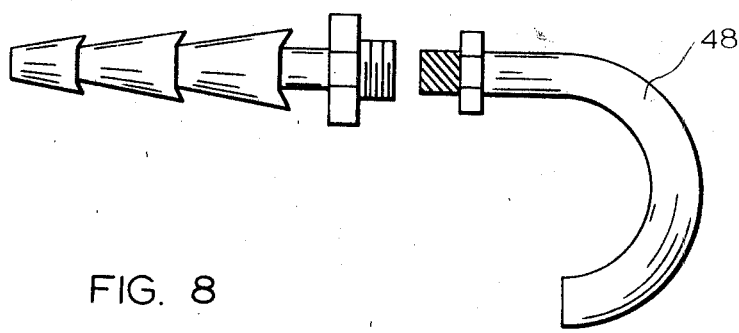
Figure 9:
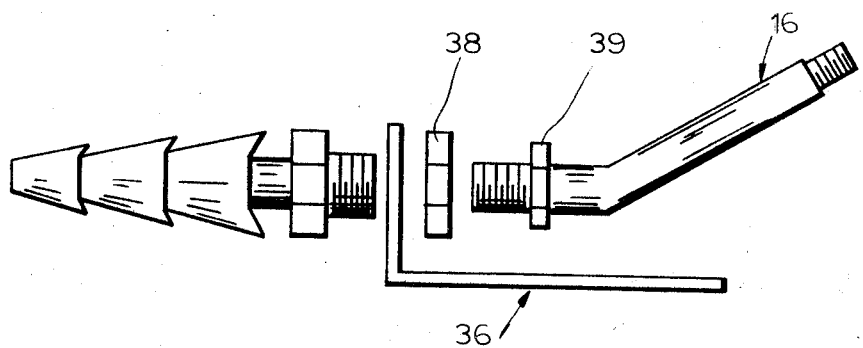

FIG. 8 is a perspective view of one end of the device shown in FIG. 1, and,

FIG. 9 is a perspective view of the other end of the device shown in FIG. 1.

The tubeless tire seating belt 10, shown in the drawing has a length of inflatable tubing 12 of rubber, neoprene etc. The tubing 12 is sealed at one end 14 and has a metal inflation fitting 16 extending from the other end 18. Surrounding the tubing 12 is a woven cylindrical web sheath 20 made of a plurality of metal wires 22 each wire 22 having a plurality of individual strands 24.

Cylindrical web sheath 20 has collars 26 and 28 at each end consisting of a portion of the web bent outwardly back. Disposed over the collar and extending inward is an inner shield 30 which is a cylindrical cup made of steel, metal, or rubber having a bottom portion fitting over the web and a cylindrical side wall extending around the web collar. Disposed over the collar and inner shield 30 is an outer shield 32. Outer shield 32 covers the outer ends of the cylindrical web 20 and has central apertures 34 for the passage therethrough of other components. The outer shields 32 at both ends are crimped together with great pressure by a commercially available crimping machine so that the components passing through the central apertures 34 will be held tightly. One of the components passing through central aperture 34 is inflation fitting 16 made of a cylindrical bent metal tube threaded towards the bent junction. Fitting 16 may be made of one or more pieces as shown in FIG. 9, and has an inner barb or spur. A portion of the fitting enters the central aperture 34 and is held therein by the crimping just described. The outer portion of the fitting also holds an elbow 36 having an aperture at one end through which the fitting passes. The elbow and the fitting are further held in place by a lock nut combination, 38, 39 engaging the threads of the fitting and permitting the fitting inlet section 40 to extend at an angle so as to receive a pressurized fluid, e.g., air for inflation. Elbow 36 has end retainer 42 to which is affixed the end 44 of a chain 46. At the other end of the belt, passing through central aperture 34 of outer shield 32 is a metal hook 48. Hook 48 may also be made of one or more pieces with an inner barb or spur, has an inner end which extends inside web sheath 20 and is crimped into place while the outer end of hook 48 is free to engage chain 46.

When mounting a tire 50 on a wheel, the deflated tire is placed on wheel 52 and the belt 10 is wrapped around the tire. The hook 48 is placed into one of the rungs of chain 46 so as to have a fairly tight fitting. Then, an air valve is placed to fitting inlet section 40 and the belt is inflated so as to press the bead of the tire 50 against the rim of the wheel 52.

It has been found that sometimes there is a nail in the tire which will pierce through sheath 20 and puncture tubing 12. To prevent this damage to the tube an apron 54 is placed along the outside of the sheath.

Apron 54 at least partially encircles the sheath. It may be either inside or outside the sheath. It is fixed at one apron end 56, but rides free at the other end 58 to allow for expansion of the belt. It is held by a plurality of rings 60 to the sheath, or similarly to the tubing if inside the sheath. The apron will act to prevent the sheath weave from fraying and protects the hands also.

Of particular importance is the weave used in the web sheath. Notwithstanding the teaching of the prior art and particularly the mathematical calculations for most effective manner of weaving provided by the workers in the art, e.g., as shown in the aforesaid U.S. Pat. No. 2,835,319, the present applicant has found that the helical weave and the helical angles therein suggested are not satisfactory for applicant's purpose. Indeed, applicant's strands 24 form wires 22 which are very gradually woven around the tubing. The angles of intersection are preferably a very small angle of the order of under 20°. The engagement of wires is not helical. When expanded, the intersection of the wires change their angles considerably going from about 20° to about 75°. Furthermore, for applicant's purpose, a close weave is not used. Indeed, the wires are loosely woven with plenty of space to spare inbetween. The particular sheath is commercially available and is shown in several catalogues, e.g., McMaster-Carr Supply Co. (Chicago, Ill.), catalogue pages 884 to 886.

The seating belt is made as follows:

Commercially available cylindrical sheaths in large rolls and commercially available flexible tubing sized to fit within the sheath also in large rolls is used. Both the sheath and tubing are cut to the proper size to fit around a tire. Collars are formed on the sheath. One end of the tubing is sealed with a metal seal and the gas inlet fitting is placed on the other end. The tubing is inserted into the sheath with the inlet fitting extending outside of the sheath. Inner shields 30 are placed over the collars, the hook 48 is inserted at the one end of the sheath where the tubing as been sealed. An outer shield is then placed over the hook, inner shield and collar and this end is then placed in a crimping machine where these components are crimped together. Then, elbow 36 with the chain already thereon is placed over the inlet fitting. Again, the inside and outside shields are placed over the collar. The end with the inlet fitting is placed in a crimping machine and the article is then finished by grinding off stray crimped metal.

It is to be observed therefore that the present invention provides for a seating belt for seating tubeless tires on a wheel rim. The seating belt comprises an elongated flexible tube, sealed at one end, a gas feed fitting at the other end of the tubing including a threaded central section and a fitting inlet for receiving a compressed gas. A cylindrical sheath is placed around the tubing. This sheath has a wire mesh, the individual wires of the mesh intersect at a small angle. The sheath has outwardly turned collars at both ends. The fitting inlet projects through one of the collars. A hook passes through the collar from the end opposite the inlet fittings. Crimped shield means are disposed over the collar to hold the hook and inlet fitting in place. Attached to the fitting are chain holding means with a chain extending from the chain holding means and which can engage the hook so that the seating belt can be placed around the tire to be mounted, the hook engaging the chain, and, the tubing can be filled with compressed air through the inlet fitting. Furthermore, the present invention provides for a simple process for manufacturing a seating belt, comprising the steps of cutting lengths of flexible tubing and cylindrical wire mesh sheathing, wherein the wires intersect at small acute angles; sealing one end of the tubing, placing a threaded feed fitting at the tubing other end; forming collars at both ends of the sheath; placing the tubing in the sheath with the inlet end of the fitting extending outwards past the collar; placing a hook through the collar with the hook end extending outwardly; placing shields over the collar, crimping the shields to hold the hook and fitting; and, bolting the free end of an elbow with a chain at the other end over the fitting through an aperture in said free end.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A seating belt for seating tubeless tires on a wheel rim comprising in combination;
    (a) an elongated flexible tube, sealed at one end;
    (b) a gas feed fitting at the other end of said tube including a threaded central section and a fitting inlet for receiving a compressed gas, said fitting being of bent shaped and the fitting inlet projecting out at an angle to the tube readily facilitating feeding of gas to the inlet;
    (c) a cylindrical sheath surrounding said tubing having a wire mesh, the individual wires of the mesh intersecting at a small acute angle with outwardly turned collars at both ends, the fitting inlet projecting through one of the collars;
    (d) a holder passing through the collar from the end opposite the inlet fitting;
    (e) crimped shield means over the collars to hold the holder and inlet fitting in place including cup-shaped inner shields disposed over the collars and extending inwards from the collars with central apertures, cup-shaped outer shields likewise disposed over the collars but extending outwards therefrom and having central apertures for passage of components; holding means attached to the fitting; and, a line extending from the holding means which can be engaged by the holder, whereby the seating belt can be placed around a tire to be mounted, the holder then engages the line and the tubing is filled with compressed air through the inlet fitting.

2. A device as claimed in claim 1 wherein said holding means includes an elbow with an aperture at one extremity held over the fitting by a bolt, and retaining means at the other extremity for holding the line.

References Cited

UNITED STATES PATENTS 2,835,319    5/1958    Fleming _____ 157—1.21

GRANVILLE Y. CUSTER, Jr., Primary Examiner